United States Patent Office 3,725,292
Patented Apr. 3, 1973

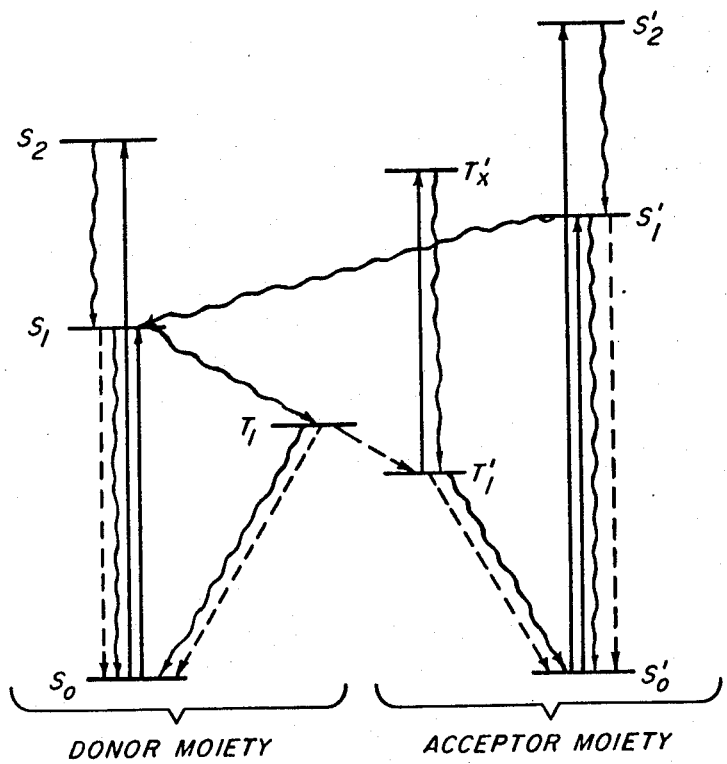

3,725,292
SINGLE AND DOUBLE ENERGY TRANSFER IN TRIPLET-TRIPLET PHOTOCHROMIC COMPOSITIONS
Gerard Ernest Gerhardt, Warren Township, Somerset County, N.J., assignor to American Cyanamid Company, Stamford, Conn.
Continuation-in-part of abandoned application Ser. No. 729,592, May 16, 1968. This application Nov. 25, 1970, Ser. No. 92,913
Int. Cl. G02b 5/20; F21v 9/02, 9/06; G02c 7/10
U.S. Cl. 252—300                        4 Claims

ABSTRACT OF THE DISCLOSURE

A photochromic composition of matter capable of exhibiting photochromism upon exposure to electromagnetic radiation, often colloquially called light, having a wavelength in the range of 200-2,000 nanometers, comprises:

(a) a polymeric substrate capable of transmitting light in the range of 200-2,000 nm. and
(b) about 0.0001 to 2.0% based on the weight of (a), of a photochromic compound of the formula:

$$(D)_m - x - (A)_n$$

wherein D is a chromophore moiety derived from a compound DH, which undergoes a transition to the first excited singlet state upon exposure to light having a wavelength in the range of 200-2,000 nm., $x$ is a bridging function holding together the chromophores D and A; and A is a chromophore derived from the compound AH, which compound AH is characterized by a first excited singlet state at a higher energy level than the first excited singlet state of compound DH, and a lowest triplet state at a lower energy level than the lowest triplet state of compound DH whereby (1) light (electromagnetic radiation) is absorbed to raise one chromophore to an excited singlet, (2) the energy converts to the triplet state, and (3) in the triplet state a chromophore absorbs light at a different wavelength; the functions 1, 2 and 3 occurring in at least two separate bonded chromophores.

CROSS-REFERENCES AND PRIOR ART

This application is a continuation-in-part of Ser. No. 729,592, May 16, 1968, Gerhardt, Photochromism by Triplet-Triplet Absorption (Bridged Compounds), now abandoned, in favor hereof.

Canadian Pat. 746,257, Stamm, Brinen, Halverson and Hosterman, Photochromic Polymer Matrix, Nov. 15, 1966, and a corresponding U.S. Pat. 3,635,544, Jan. 18, 1972, Stamm, Brinen, Halverson and Tennant (nee Hosterman), Photochromic Polymer Matrix, issued on Ser. No. 769,028 Oct. 21, 1968, which is a continuation-in-part of Ser. No. 332,752, Dec. 23, 1963 now abandoned; describe a photochromic filter using a polynuclear aromatic ring system incorporated into a matrix which is free from residual monomer and oxygen. An intensifying synergic agent is disclosed as present in preferred embodiments, which synergic agent permits single and double energy transfer (page 3, lines 1 to 4).

The use of deuterated polycyclic aromatic compounds in photochromic filters is described in U.S. Ser. No. 807,920, Mar. 17, 1969, Stamm, a continuation-in-part of U.S. Ser. No. 408,718, Oct. 30, 1964 now abandoned. A counterpart is Canadian Pat. 781,707, Apr. 2, 1968.

Additional closely related subject matter is disclosed in De Lapp, Stamm, Arter, 77,392, Oct. 1, 1970, now abandoned. Sealing Filters; Stamm, 77,393, Oct. 1, 1970, Poly-Sealing Filters; Stamm, 77,393, Oct. 1, 1970, Polycarbonate Matrix for Photochromic Compounds; De Lapp, 77,731, Oct. 2, 1970, Supersaturated Solid Solutions of Photochromic Materials in Epoxides; Stamm and Tennant, 77,761, Oct. 2, 1970, Epoxy Polymer Matrix for Photochromic Compounds.

Certain of the compounds used in the present invention are new compounds. Certain of these compounds per se are described and claimed in G. E. Gerhardt 729,515, May 16, 1968, Polyphenylmethyl Photochromic Compounds, now Pat. 3,609,194, Sept. 28, 1971; J. Kazan 729,521, May 16, 1968, New Photochromic Compounds (Oxy and Oxyalkylene Bridges) now Pat. 3,649,696, Mar. 14, 1972 and J. E. Innes 729,520, May 16, 1968, New Photochromic Compounds (Imino and Iminoalkylene Bridges), now Pat. 3,636,481, Feb. 1, 1971.

The disclosures in the above applications are herein incorporated by reference.

The theory of single and double energy transfer is developed at length in N. J. Turro "Molecular Photochemistry" W. A. Benjamin Inc., New York 1967. The energy diagram on page 129 and the transfer of excitation energy between isolated chromophores, such as through a mono-, di- or tri-methylene bridge between 1-naphthalene and 9-anthracene, and the comparison of the spectra with 1-methylnaphthalene and 9-methylanthracene gives a good theoretical approach to energy transfer phenomena. A similar system is described for 1-methylnaphthalene and 4-methylbenzophenone (pages 127 and 128).

This text discusses activation particularly from its significance in organic photoreactions. A table of triplet energies is given at page 132, which table is herein incorporated by reference.

The energy relationship of absorption is $$E_2 - E_1 = h\nu$$

where $E_2$ and $E_1$ are the energies of a single molecule in the final and initial states, $h$ is Planck's constant $(6.6254 \pm .0002 \times 10^{-27}$ erg. sec.), and $\nu$ (nu) is the frequency (sec.$^{-1}$), at which the absorption occurs.

The absorption is often expressed in wavelength $\lambda = c/\nu$ where $\lambda$ (lambda) is the wavelength, often in angstroms (A) and $c$ is the velocity of light.

The absorption band is often expressed in wavenumbers $\nu = 1/\lambda$, usually in reciprocal centimeters. This is the number of wavelengths per centimeter.

Frequently the physicist uses wavenumbers, but a spectroscopist often prefers wavelengths. As shown above, such units are reciprocal and readily converted.

As illustrative:

CONVERSION TABLE

| λ, A. | $\bar{\nu}$, Cm.$^{-1}$ | ($E_2-E_1$) K cal./mole | eV |
|---|---|---|---|
| 2,000 | 50,000 | 143.0 | 6.20 |
| 4,000 | 25,000 | 71.5 | 3.10 |
| 7,000 | 14,286 | 40.8 | 1.77 |
| 20,000 | 5,000 | 14.3 | 0.62 |

From original derivation the word photochromic refers to a color change from light, sometimes called phototropic. Originally light referred to electromagnetic radiation visible to the human eye, about 4,000 to 7,000 A., or 400 to 700 nanometers (nm.) or 0.4 to 0.7 micron, or 25,000 to 14,286 cm.$^{-1}$; but historically the term light is frequently used to include adjacent regions of the electromagnetic spectrum.

Herein photochromism involves a change in absorbance derived from an activation energy of incident light in the range of 200 to 2,000 nonometers. The change in absorption spectrum results from formation of a triplet state having an absorption different from that of the ground state. Absorption in regions outside the visible range is valuable in infrared filters, ultraviolet filters, in Q switched lasers, and for other purposes. A photochromic bleachable filter for a Q switched laser permits using an independent light source to control the intensity and characteristics of a laser beam.

SUMMARY OF THE INVENTION

This invention relates to photochromic compositions which are composed of a non-opaque (i.e. translucent or transparent) polymeric substrate and a particular type of photochromic compound. The use of a polymeric matrix in photochromic compositions is old as shown by Stamm et al. 769,028, supra. Therein a photochromic material and a synergistic material are both incorporated in the substrate.

For a photochromic effect of the triplet type, three independent steps are required. A chromophore must absorb activating radiation to raise ground state molecules to an excited singlet; as a second step an excited singlet must by a process known as intersystem crossing, cross to a triplet state; and third the triplet state molecules absorb incident radiation to go from a first triplet level to a higher level. As these three steps are basically separable, it has been found that different moieties or chromophores or parts of a molecule can accomplish each of the three steps more effectively than a single molecular configuration can accomplish all three. In Stamm et al. 769,028 a separate synergic agent was taught as being present for single or double energy transfer.

By the present invention it is found that two different molecular moieties or chromophores are coupled together by valence bonds through a bridge which consists of one or more molecules. One chromophore is particularly efficient at absorbing incident radiation to become activated at the singlet level. One chromophore moiety is particularly efficient in causing intersystem crossing from the singlet to the triplet state; and the third step of triplet-triplet absorption is very efficiently performed within the molecule, by a chromophore having a high triplet extinction coefficient.

The present invention teaches that the three functions are accomplished within a single molecule by having at least two chromophore moieties tied together so that each can accomplish one or two steps of the process most efficiently.

Single energy transfer refers to a system in which a donor chromophore D absorbs incident radiation and transfer energy to the acceptor chromophore A which has a triplet configuration with a high triplet extinction coefficient to give a high color level in the triplet form. The intersystem crossing may be accomplished in either D or A, usually D. In double energy transfer, the acceptor itself absorbs the incident radiation, but is not particularly effective for intersystem crossing, the energy transfers once to a separate chromophore manifold in which the intersystem crossing from singlet to triplet energy is more readily accomplished, and then the energy in triplet form is transferred a second time back to the acceptor moiety which is now in the triplet configuration and absorbs incident radiation at the desired wavelength for the triplet photochromic effect.

The term D is used for the donor of triplet energy, whether D absorbs the activating radiation, or receives activation by the transfer of singlet energy. A is used for the chromophore which accepts triplet energy, and is the photochromic absorbing chromophore.

The term light is one of the best known but most misunderstood and misused terms in common use. To a purist, light is only that portion of the electromagnetic spectrum which is visible to the normal human eye. The term light is frequently used to cover also adjacent portions, and is so used here.

Stamm et al., supra, and most of the prior work, has been with molecules in which all three steps were to be accomplished in the same chromophore, or as taught in Stamm there may be a synergic chromophore present.

The present invention teaches that by having a molecular bond between the two portions, at least two chromophores are held spatially adjacent, and in such proximity as to permit ready transfer of energy, either once or twice.

The term "photochromic" as used herein designates a compound which, upon exposure to light (i.e., activating radiation having a wavelength of 200–2,000 nanometers) undergoes a reversible change in its absorption spectrum.

Previously known polymeric photochromic compositions have had deficiencies such as slowness in color development upon exposure to light, slowness in decay of color upon removal of light and low intensity of the developed color.

It is an object of the present invention to provide new photochromic systems having a photochromic compound and a non-opaque substrate, which compositions are uniquely useful for optical and instrumentation purposes.

It has been discovered that when a compound of the formula

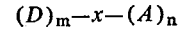

$$(D)_m-x-(A)_n$$

is incorporated in a non-opaque substrate, the resulting composition is photochromic in response to radiation in the range of 200–2,000 nanometers. The nature of D and A will be explained in detail in terms which are graphically illustrated in the accompanying figure; but first the principles of this invention will be described in general terms.

The compound $(D)_m-x-(A)_n$ is composed of a donor chromophore or moiety D, a bridging function $x$ such as a bond, $CH_2$, O, $CH_2O$, etc., and an acceptor chromophore or moiety A. The moiety D may be derived from the compound DH, the moiety A may be derived from the compound AH, and the moiety $x$ may be supplied by either D or A depending upon the chosen method for synthesizing the compound $(D)_m-x-(A)_n$. The letters $m$ and $n$ are each at least 1 and their sum is equal to the valence of $x$.

In the above, Compound DH, and moiety D derived therefrom, undergo a transition to the first excited singlet state upon exposure to light having a wavelength from 200–2,000 nonometers. Compound DH, upon absorption of light in the stated range must have a high intersystem crossing efficiency between the first excited singlet state and the lowest triplet state. Compound AH from which moiety A is derived must have (1) a first excited singlet state at a higher energy level than the first excited singlet state of Compound DH and (2) must have a lowest triplet state at a lower energy level than the lowest triplet state of Compound DH. The first restriction prevents the transfer of singlet energy from D to A before conversion of singlet energy to triplet energy can occur within D. The second restriction permits rapid transfer of triplet energy from D to A.

Furthermore, the energy difference between the first triplet level and the higher triplet level of Compound AH must be different from the energy difference between the ground state and the first excited singlet state of Compound DH.

This restriction permits a change in absorption when triplet A is formed.

Because the absorption spectrum is based on the orbital electrons, and the configuration in singlet or triplet is a characteristic of the outer orbital electrons, the chemical constitution inside each chromophore moiety is comparatively unimportant as long as the exterior orbital shell has the desired absorption pattern.

The advantages of the present photochromic composition are: (1) rapid color development or change when irradiated by light and rapid color decay when the light is removed, and (2) increased intensity of the developed color due to great efficiency of energy transfer from one moiety to the other, and (3) the selection of bonded chromophores which are each spectacularly efficient for one step in the process.

The compositions of this invention have many uses, including use in sunglasses, welding goggles, skylights, automobile windows and windshields, windows for buildings and dwellings, windows for space vehicles and aircraft, paints and surface coatings for novelty effects, energy measuring devices, lasers etc.

Before proceeding further, it may be useful, with reference to the figure, to define the terms "ground state" ($S_0$), "excited singlet state" ($S_1$, $S_2$, $S_x$, etc.) and "excited triplet state" ($T_1$, $T_2$, $T_x$, etc.).

The ground state ($S_0$) is the non-excited state of an atom, molecule or fragment of a molecule in which all of the electrons are spin paired in the lowest available energy levels. At room temperature and below, essentially all moieties have a stable ground electronic state ($S_0$) which is also the lowest energy state.

The first excited singlet state ($S_1$) is the state of an atom, molecule or fragment of a molecule which has absorbed one quantum of energy resulting in the transfer of an electron from one orbit to the next higher orbit, the transferred electron retaining its same direction of spin.

The first or lowest triplet state ($T_1$) is the state of such a moiety after absorption of one quantum of energy, whereby an electron is transferred from one orbit to another, and some of the absorbed energy is lost with reversal in spin of the transferred electron. The $T_1$ state is thus differentiated from the $S_0$ state by having a promoted electron whose direction of spin has been reversed.

The figure shows an energy level diagram of the mechanism by which the triplet-triplet light absorption phenomenon occurs. Molecules do not have random energy levels. Only definite levels of energy are possible, and are characteristically unique for any given molecular species. Electronic energy levels are depicted by the horizontal lines, and the transitions between the energy levels are indicated by vertical or diagonal arrows, upward arrows representing absorption and downward arrows emission or non-radiative decay. Full and broken arrows are used for transitions which can be observed optically, whereas wavy lines indicate radiation-less transitions.

Two series of electronic levels are shown for each moiety. The lowest or ground energy levels for the donor and acceptor moieties are shown at $S_0$ and $S_0'$, respectively. Absorption of a quantum of energy by either moiety raises the energy level of the moiety to a first excited state, i.e., to the first singlet state, $S_1$ and $S_1'$, for donor and acceptor moieties, respectively. When a molecule passes from excited state $S_1$ to a lower state $S_0$ and light is emitted, the phenomenon is called fluorescence. The lowest triplet state ($T_1$) is below the first singlet state ($S_1$) and, for this invention, donors are chosen in which the energy of the first singlet state will pass easily to the first triplet state. Compounds in which the conversion from $S_1$ to $T_1$ is high are said to have a high intersystem crossing efficiency. It is highly desirable that the donor part of $D-x-A$ have this high efficiency. A transition from a triplet state to a singlet state, as from $T_1$ to $S_0$, resulting in light emission, is called phosphorescence. Excited states can also be deactivated by radiation-less transition as from $S_1$ to $S_0$ and from $T_1$ to $S_0$.

The mechanism of the photochromic effect of the present invention requires that under light of a given wavelength, one fragment of the photochromic molecule $D-x-A$ absorbs and is "activated." The fragment which absorbs the incident light, may be the "donor" portion of the molecule, and after absorption undergoes intersystem crossing from the excited singlet level to the triplet level and then transfers energy from its triplet level to the acceptor fragment. The donor may receive singlet energy by transfer from some other chromophore, and convert the singlet energy to triplet energy and then donate the triplet energy to the acceptor A.

The donor fragment, D, may be a complex system containing an acceptor moiety, A' (which may or may not be the same as A), but still retaining the capability of donating energy to the acceptor A. The acceptor chromophore in its lowest triplet level absorbs light in the range of 200-2,000 nanometers and is converted to a higher triplet state.

The acceptor fragment, A, may be a complex system containing a donor moiety, D' (which may or may not be the same as D), but still retaining the capability of accepting energy from the donor moiety D.

The absorption of light by the acceptor fragment in its triplet state is observed as color, which disappears when the light source is removed. This is the photochromic effect. In essence, therefore, the present invention provides a means for converting the acceptor fragment to a form, namely its lowest triplet state, which is capable of absorbing light in the range of 200-2,000 nanometers. The donor portion thus acts as an activator for the acceptor portion, so that the latter is converted to its light-absorbing triplet state.

In order for the present photochromic system to operate, the two fragments must have a certain relationship to each other. The energy of the lowest triplet state of the donor fragment must be higher than that of the lowest triplet state of the acceptor fragment. The donor fragment must require less energy for conversion to its singlet state than the acceptor fragment. Since the energy levels just referred to are on a relative basis, it will be apparent that a fragment may be suitable as a donor when it is hooked to a given acceptor fragment of certain energy requirements, whereas it would be unsuitable as a donor if hooked to another acceptor fragment of other energy requirements.

Also, the energy required to convert the acceptor portion or moiety from its lowest triplet state to the second or higher triplet state must be different from the energy absorbed by the donor portion or moiety in going from its ground state to its lowest excited singlet state.

To obtain the most desirable results, it is generally preferred to use a system in which the triplet-triplet absorption of the acceptor moiety ($T_1' \rightarrow T_x'$) lies at longer wavelengths (lower energy) than the singlet-singlet absorption ($S_0 \rightarrow S_1$) of the donor portion, thus minimizing competition for the exciting radiation.

In the present invention, the first or lowest triplet state of an acceptor moiety is populated by energy transfer from the lowest triplet state of a donor moiety, the lowest triplet of the donor moiety being at a higher energy level than the lowest triplet of the acceptor moiety. Acceptor moieties at the lowest triplet level can act as entities. They can absorb energy and go to a higher triplet state by absorbing a quantum of energy. The energy difference between the two triplet states determines the wavelength of the absorbed light. The first triplet state can be sufficiently populated if the light intensity is sufficiently high, an efficient intersystem crossing exists, and its lifetime is sufficiently long. Since the triplet state of the donor compound ($T_1$) is at a higher energy level than the first triplet state of the acceptor compound ($T_1'$), triplet-triplet energy transfer occurs from the lowest triplet level of the donor to the lowest triplet level of the acceptor, thereby populating the acceptor triplet ($T_1'$). As stated above, the populated triplet state of the acceptor can then absorb energy and be promoted to the higher triplet state, $T_x'$. This transition is observed as an absorption band in the ultraviolet, visible or near infrared part of the spectrum.

Another path of energy transfer between the moieties may possibly reinforce the above-described effect. Thus, since the first excited singlet state of the acceptor ($S_1'$) is above that of the donor compound ($S_1$), singlet-singlet energy transfer might take place, that is, from $S_1'$ to $S_1$. This step can then be followed by the previously described energy transfer $S_1$ to $T_1$ to $T_1'$.

For the photochromic system of this invention to operate efficiently, the following characteristics are desirable:

(1) A fraction of the incident radiation (200 to 2,000 nanometers) should be absorbed by the system, most of this absorbed energy eventually appearing in the excited single state of the donor. The donor may receive this energy directly ($S_0 \rightarrow S_1$) or by transfer from another singlet, e.g., via a higher singlet ($S_2 \rightarrow S_1$) or the acceptor singlet ($S_1' \rightarrow S_1$).

(2) The donor should have little or no fluorescence ($S_1 \rightarrow S_0$), so that the $S_1$ level is not depleted.

(3) The intersystem crossing efficiency of the donor ($S_1 \rightarrow T_1$) should be high, for high population of $T_1$.

(4) The non-radiative transfer of energy from the first triplet state ($T_1$) of the donor to its stable state ($S_0$) should be slow relative to the rate of energy transfer to the acceptor moiety.

(5) The first triplet state of the donor ($T_1$) must be at a higher energy level than the first triplet of the acceptor ($T_1'$).

(6) The first triplet state ($T_1'$) of the acceptor should have a long enough life to attain a population of the acceptor moieties in their triplet state sufficient to absorb light. A half-life of at least one second is usually needed for easy visual detection.

(7) The extinction coefficient for transitions from the first triplet state of the acceptor to the higher triplet state ($T_1' \rightarrow T_x'$) should be high.

(8) The transition from the first triplet state of the acceptor to the higher triplet state ($T_1' \rightarrow T_x'$) should have a different energy than the transition from the ground state of the donor to the first excited singlet state ($S_0 \rightarrow S_1$).

(9) The energy level of the first excited singlet state of the donor ($S_1$) is at a lower level than that of the first excited singlet state of the acceptor ($S_1'$).

The three important energy relationships between donor and acceptor moieties can be shown at follows:

$$T_1 \rightarrow S_0 > T_1' \rightarrow S_0'$$
$$S_0' \rightarrow S_1' > S_0 \rightarrow S_1$$
$$S_0 \rightarrow S_1 \neq T_1' \rightarrow T_x'$$

In summary, a triplet-triplet photochromic system is obtained by incorporating in a non-opaque substrate, a compound having acceptor and donor moieties, neither one of the compounds corresponding to the said moieties having been expected to exhibit useful or substantial photochromism when used individually. One moiety (the acceptor) should have a long-lived triplet state and an excited singlet state which does not convert readily into this triplet state. The other moiety (the donor) should easily convert from an excited singlet to a triplet of greater energy than the acceptor triplet. The energy of the donor triplet should be efficiently transferred to the acceptor moiety, thereby forming the long lived acceptor triplet. The absorption spectrum of the acceptor triplet is the source of photochromism. The excited singlet state of the donor should be obtainable either by direct absorption of light or by transferral of energy from a more energetic excited singlet state of the donor or acceptor.

To practice the present invention, one may first choose the D moiety, derived from the compound DH, which should have the following characteristics: it must absorb energy in the region of 200–2,000 nanometers and it must have good intersystem crossing efficiency. Given the energy level of the first excited singlet state and the lowest triplet state of the D fragment (or more precisely of the $D-x$ fragment, since the bridging function ($x$) may affect the energy levels of the donor moiety), one can then choose the A fragment, or more precisely the $A-x$ fragment, which can be gainfully joined to D to give a photochromic effect. The A fragment must absorb light at a higher energy level than the D fragment. The energy level of the lowest triplet state of A must be below the lowest triplet level of D.

The energy required to transform the A fragment from its lowest triplet species to its higher triplet species must be different from the energy required to bring the D fragment from its ground state $S_0$ to its first excited singlet state $S_1$.

Alternatively, on may first choose the A moiety, derived from the compound AH, which should have the following characteristics: it must have triplet-triplet absorption in the region of 200–2,000 nanometers and, under the conditions of use, the lifetime of the lowest triplet level must be long enough to permit the build-up of a sufficient population to generate a detectable triplet-triplet absorption. Given the energy level of the lowest triplet state of the A fragment, one can then choose the D fragment which can be gainfully joined to A to give a photochromic effect. The D fragment must have its first excited singlet level at lower energy than the first excited singlet level of the A fragment. The energy level of the lowest triplet state of D must be above the lowest triplet level of A.

The methods by which the energy levels of the first excited singlet state, the lowest triplet state, and the higher triplet state of the fragmens of he photochromic molecule are measured, as well-known to the art. The excited singlet level is easily obtained from the normal absorption spectrum obtained by a spectrophotometer. When there is fluorescence, the same information can be obtained in a spectrofluorimeter. The lowest triplet level is usually obtained from the phosphorescence spectrum; however, a recent technique of phosphorescence excitation is very sensitive. The higher triplet level can be determined by spectrophotometry if enough of the molecules are in the first triplet state. This can be done by flashing with an extremely bright light, then immediately obtaining absorption data, as by the use of photographic methods.

Representative organic compounds of use in this invention may be listed in descending order of lowest triplet energies. Theoretically, for any pair of moieties, the one with the greater energy at its lowest triplet level can act as donor and that with the lesser energy at lowest triplet level as acceptor. However, the other energy relationships which have been set forth above must be met for a practical photochromic composition.

Following is a list of compounds, the moieties of which are characterized by a descending order of lower triplet energies.

LOWEST TRIPLET ENERGIES OF ORGANIC COMPOUNDS IN DESCENDING ORDER (cm.$^{-1}$)

29,800—benzene
29,650—pyridine
29,500—fluorobenzene
29,150—benzotrifluoride
28,900—toluene
28,700—methyl phenyl sulfone
28,570—chlorobenzene
28,500—phenol
28,500—triphenylmethane
28,400—tetraphenyl tin
28,300—phenylcyclopropane
28,200—anisole
28,200—tetraphenyl silicon
27,200—benzoic acid
27,000—benzonitrile
26,800—aniline
26,420—dodecahydrotriphenylene
26,280—benzoyl chloride
26,110—propiophenone
26,400—acetophenone
26,000—p-dichlorobenzene
26,000—pyrazine
25,970—xanthone
25,900—diisopropyl ketone
25,800—hexachlorobutadiene
25,655—1,3,5-triacetylbenzene
25,585—isobutyrophenone Energies of Organic Compounds—Continued 25,500—triphenylarsine
25,300—trans-dichloroethylene
25,270—1,3-diphenyl-2-propanone
25,200—benzaldehyde
25,200—sym-trans-dibromoethylene
25,200—diphenylamine
25,200—triphenylphosphine
25,190—phenylacetylene
25,100—trans-diiodoethylene
25,000—2,2'-dichlorobiphenyl
25,000—ethylene
24,810—anthrone
24,800—triphenylmethyl phenyl ketone
24,700—indole
24,540—carbazole
24,520—diphenylene oxide
24,500—2,2',6,6'-tetrachlorobiphenyl
24,500—triphenylamine
24,500—dibenzothiophene
24,400—benzophenone
24,400—2,2'-difluorobiphenyl
24,400—4-hydroxyacetophenone
24,400—tryptophan
24,100—4-hydroxybenzophenone
24,045—o-dibenzoylbenzene
23,970—thianaphthene
23,900—tetraphenyl lead
23,800—4,4'-dichlorobenzophenone
23,800—triphenylene
23,750—fluorene
23,700—p-diacetylbenzene
23,400—9-benzoylfluorene
23,250—10,11-dihydro-5H-dibenzo(a,d)cyclohepten-5-one
23,240—p-cyanobenzophenone
23,200—2,2',4,4',6,6'-hexachlorobiphenyl
23,000—4,4'-difluorobiphenyl
22,925—thioxanthone
22,800—diphenyl
22,700—2-aminofluorene
22,620—1,3,5-triphenylbenzene
22,200—phenanthridine
22,100—1,10-phenanthroline
22,000—4,4'-bis-(dimethylamino)benzophenone
21,880—5,6-Benzoquinoline
21,875—phenylglyozal
21,860—diphenylacetylene
21,840—anthraquinone
21,800—2,4-dimethylquinoline
21,780—4-methylquinoline
21,770—phenanthrene
21,740—7,8-benzoquinoline
21,700—flavone
21,700—phthalimide
21,700—cis-stilbene
21,700—quinoline
21,660—ethyl phenylglyoxalate
21,600—styrene
21,310—naphthalene
21,300—crystal violet carbinol
21,300—8-methylquinoline
21,210—isoquinoline
21,200—α-methylnaphthalene
21,100—β-bromonaphthalene
21,100—β-naphthol
21,100—nitrobenzene
21,000—β-chloronaphthalene
20,970—α-fluoronaphthalene
20,900—methyl α-naphthyl ether
20,900—β-naphthoic acid
20,900—β-naphthaldehyde
20,860—β-naphthyl phenyl ketone
20,800—β-methylnaphthalene
20,800—2-nitrobiphenyl Energies of Organic Compounds—Continued 20,800—thio-β-naphthol
20,700—β-acetonaphthone
20,700—α-bromonaphthalene
20,700—α-chloronaphthalene
20,700—β-naphthonitrile
20,700—1-nitro-2-methylanthraquinone
20,600—3,4-benzophenanthrene
20,600—2-nitrofluorene
20,570—p-terphenyl
20,550—1,2,;3,4;5,6;1,8-tetrabenzanthracene
20,500—α-iodonaphthalene
20,500—α-naphthol
20,500—4-nitrobiphenyl
20,360—1,2;6,7-dibenzopyrene
20,300—dimethyl-α-naphthylamine
20,300—m-nitroacetophenone
20,200—acridine yellow
20,200—4,4'dinitrobiphenyl
20,200—α-naphthoic acid
20,200—di-α-naphthylurea
20,200—8-nitroquinoline
20,200—phenyl-β-naphthylamine
20,100—α-naphthyl phenyl ketone
20,100—ethyl α-naphthoate
20,100—α-naphthonitrile
20,100—α-naphthylamine
20,100—β-naphthylamine
20,080—1,2-benzofluorene
20,080—2,3-benzofluorene
20,080—picene
20,000—chrysene
20,000—1,8-dinitronaphthalene
20,000—thianthrene
19,900—1,5-dinitronaphthalene
19,900—α-naphthaldehyde
19,850—1$^{3,5}$,5$^{3,5}$-tetramethylquinquephenyl
19,800—benzamide
19,800—1$^{3,5}$,4$^{3,5}$-tetramethylquaterphenyl
19,800—3,4;5,6-dibenzophenanthrene
19,800—di-β-naphthylamine
19,800—3-nitrodiphenylene
19,760—5,6-benzochrysene
19,740—α-acetonaphthone
19,700—diacetyl
19,640—8,9-trimethylene-3,4-benzophenanthrene
19,560—2,2'-binaphthyl
19,530—5,12-naphthacenequinone
19,420—5,12-dihydro-5-naphthacenone
19,370—1,2;3,4;5,6-tribenzanthracene
19,300—1-nitro-2-aminonaphthalene
19,300—p-nitroaniline
19,200—α-nitronaphthalene
19,120—acetylpropionyl
19,100—coronene
19,100—1,8-diaminonaphthalene
19,050—benzo(b)fluoranthene
18,700—benzil
18,650—1,2-benzochrysene
18,510—1,2-benzopyrene
18,500—dibenzalacetone
18,500—1,2;7,8-dibenzathracene
18,450—fluoranthene
18,350—6-aminochrysene
18,300—1,2;5,6-dibenzanthracene
18,300—lycopene
18,025—benzanthrone
17,900—1-nitro-5-aminonaphthalene
17,800—benz(a)acridine
17,790—1,2;3,4-dibenzanthracene
17,750—transstilbene
17,700—benz(c)acridine
17,700—fluorescein (acid)
17,600—3,4;9,10-bibenzopentaphene Energies of Organic Compound—Continued 17,400—trans-4-nitrostilbene
17,270—1,2;7,8-dibenzochrysene
17,150—3-acetopyrene
16,930—1-aza-pyrene
16,930—pentaphene
16,800—pyrene
16,500—1,2-benzanthracene
16,180—1,12-benzoperylene
16,120—11,12-trimethylenetetraphene
15,840—acridine
15,300—phenazine
15,070—1-azaanthracene
14,900—eosin
14,870—2-azaanthracene
14,700—anthracene
14,670—3,4-benzopyrene
14,650—azulene
14,630—9-nitroanthracene
14,460—9-methylanthracene
14,100—thiobenzophenone
14,080—9,10-dibromoanthracene
14,080—9,10-dichloroanthracene
13,750—octa-1,3,5,7-tetraene
13,600—crystal violet
12,600—perylene
10,250—naphthacene
8,000—pentacene The present invention includes the use of compounds in which the acceptor moiety is deuterated. Deuterated derivatives exhibit first triplet states with longer lifetimes which will give a higher concentration of molecules in this triplet state and may thus be preferred if the undeuterated compound does not give sufficient absorption intensity during exposure to light.

As will be noted, the compounds DH and AH and, consequently, the fragments A and D may be substituted by substituents such as alkyl radicals of one to eighteen carbons, alkoxy radicals of one to eighteen carbons, halo radicals (e.g. chlorine and fluorine), amino radicals such as dialkylamino groups, alkanamido groups, and the like.

Such groups may affect the singlet and/or triplet energy levels of the donor and acceptor moieties. However, the above-defined energy level relationships must be maintained.

It will be noted that most of the DH and AH compounds are aromatic in nature. These aromatic compounds are generally preferred because they absorb in the preferred region of the spectrum. However, aromaticity is not indispensable, since compounds such as diacetyl, hexachlorobutadiene and diisopropyl ketone can be used to form the D or A fragment. It may be desirable in many cases to have various substituents on the A or D fragment to aid in dissolving the photochromic compound in the substrate in which it is to be used, since some of the unsubstituted compounds are relatively insoluble in most conventional solvents. Long chain alkyl or alkoxy groups in many cases overcome this difficulty.

As illustrative of the compounds useful in the present invention formed by linking a donor, DH, such as benzophenone, with an acceptor AH, such as p-terphenyl, the following may be listed, showing examples of the various bridging functions which may be employed to connect the A and D radicals:

Bridging Function

Bond

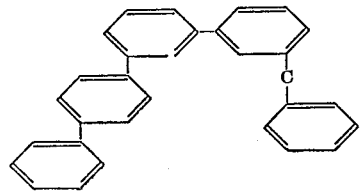

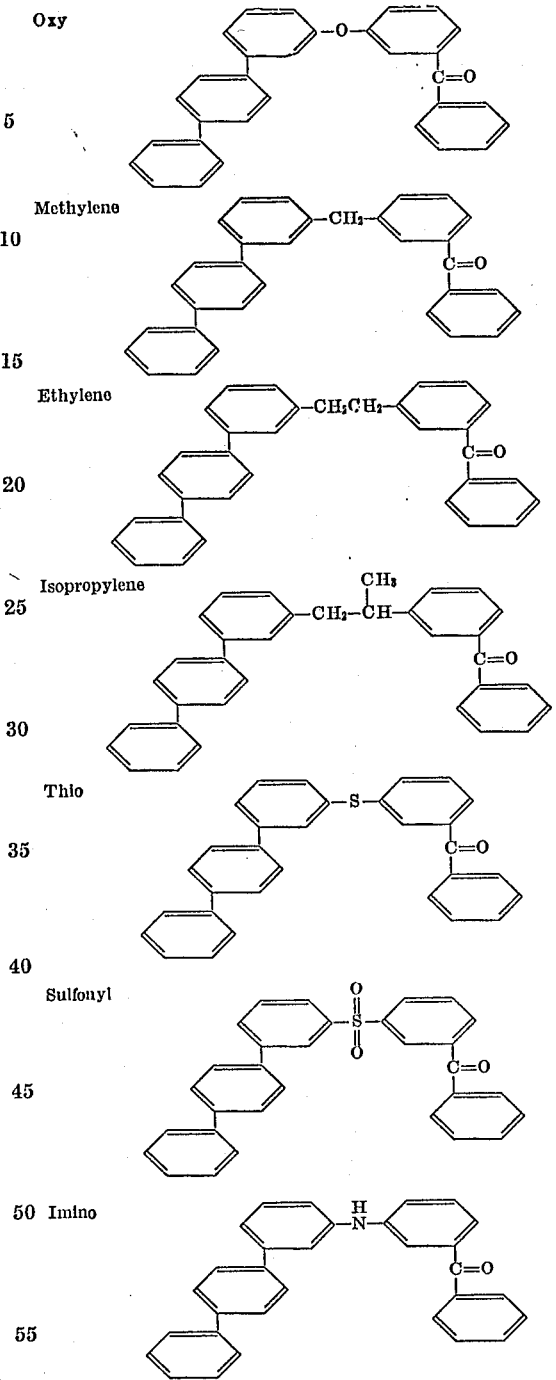

The above bridging functions are shown to illustrate the type of functions applicable. However, as will be obvious, combinations of the various functions shown, for example the combinations —SO$_2$NH— and —CH$_2$CH$_2$S— would be suitable as well as others; the following structures further illustrate such bridging function combinations.

Bridging Function

Methyleneoxy

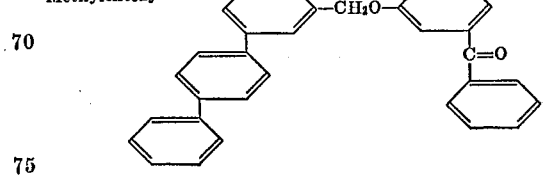

Bridging Function—Continued

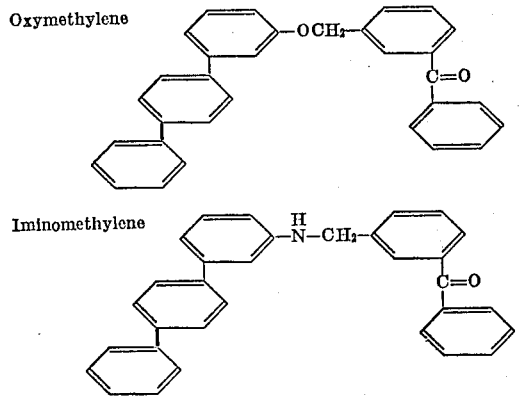

Oxymethylene

Iminomethylene

The photochromic compounds useful in this invention may be synthesized by reaction of a compound containing the desired D moiety with a compound containing the desired A moiety. In certain cases, because of process considerations, it may be more feasible to prepare the photochromic compounds by reacting materials which supply the donor moiety and part of the acceptor moiety with other materials which supply a part of the acceptor moiety. The final product will be D—x—A even though it was not formed from reactants which strictly corresponded to D and A, respectively. Thus, the photochromic compound 2-(p-terphenyl-4-yloxy)triphenylene, relies on the triphenylenyl radical as D and the p-terphenylyl as A. It can be prepared by reacting 2-hydroxytriphenylene with 4-iodo-p-terphenyl, these reactants corresponding to D and A, respectively. Alternatively, however, it can be prepared by reaction of 4-(2-triphenylenyloxy)biphenyl-4'-yllithium with cyclohexanone, followed by hydrolysis, dehydration and dehydrogenation wherein the first compound supplies the D and x moieties and also part of A, and the second compound supplies only a part of A. Alternatively, the synthesis may be accomplished by reacting materials which supply the acceptor moiety and part of the donor moiety with other materials which supply a part of the donor moiety. Thus, it is not contemplated to limit the present invention to the process by which the photochromic compounds are prepared.

The non-opaque polymeric substrates suitable for the compositions of the invention must be capable of transmitting light in at least part of the range of 200 to 2,000 nanometers, and they may be either crystalline or amorphous polymeric materials, e.g. organic polymers or inorganic glasses such as phosphate glasses and borate glasses. The organic polymeric materials include both colored and colorless thermoplastics such as polyacrylates, polymethacrylates, cellulose acetate, cellulose propionate, celulose acetate-butyrate, cellulose nitrate, ethyl cellulose, polycarbonates, polyacrylonitrile, polyamides, poystyrene, poymethylstyrenes, polychloro-methylstyrenes, poly(styrene-butadiene), poly(vinyl acetate), poly(vinyl acetals), poly(vinyl chloride), poly(vinyl butyral), poly(vinyl formal), chlorinated polyethers and silicones; and thermosetting resins such as phenol-formaldehyde condensates, malamine-formaldehyde condensates, polyester-styrene combinations, polyurethanes, epoxies and copolymers and mixtures thereof. For filters and the like the polymers should be transparent or nearly transparent over the ranges in use. Organic polymers which cut off at 270 to 300 nm. are very useful for visible light transmitting uses, with near U.V. activation. One particularly important use is in the manufacture of lenses for sunglasses and welders goggles. Preferred photochromic compounds are those which are activated by radiation of wavelengths shorter than about 410 nm. (i.e., light in the near UV region) to give an activated compound with an absorption spectrum occurring between about 400 and 750 nm. (i.e., the visible light region). The lens can be formed by combining the photochromic compound with, or coating the photochromic compound on, the material which makes up the lens. Laminar construction may be used to obtain lenses with specially desirable properties. Thus, the photochromic material can be sandwiched between two layers of non-photochromic material. The photochromic layer can be based upon a plastic which is highly compatible with the photochromic compound and the outside, non-photochromic layers can be a material having good scratch and weather resistance. Such a lens is thus advantageous from the standpoint of ease of preparation and durability of original optical properties. The substrate used for the photochromic layer can be an organic polymer of any of the above-named types. The outer, non-photochromic layers can be a clear polymeric coating applied by spraying or dipping, or clear or tinted glass which is either bonded to, or mechanically held against, the inner layer.

Triplet molecules are also known as biradicals because they possess two unpaired electrons. As such, they are extremely reactive and interact with each other, with oxygen or with any paramegnetic species. Thus, it is advantageous to employ a polymeric matrix of good optical clarity that is free from residual monomer, plasticizers, and atoms, molecules, ions, or molecular fragments capable of reacting rapidly with the metastable triplet state entities which govern the photochromic effects herein disclosed.

The photochromic material $(D)_m—x—(A)_n$ is uniformly dispersed throughout the plastic matrix. This can be done by adding the compound to the monomer or monomers followed by polymerization; by dissolving the polymer and photochromic compound in a solvent and casting a rigid sheet, film or other form; by milling the photochromic combination of compounds with the polymeric material, etc. The photochromic compound can also be applied to the formed plastic article.

The photochromic effect is a function of the concentration of the photochromic compound, the thickness of the substrate and the intensity of the exciting radiation. Given adequate light intensity the effect increases with increasing concentration and also increases with increasing thickness. For a given concentration and thickness the effect increases with increasing light intensity up to the saturation value.

The amount of the photochromic compound to be used in the compositions of the invention may range from 0.0001 to 2.0% based on the amount of non-opaque substrate. In normal practice, at least 0.0001%, preferably at least 0.05% of the photochromic compound is employed.

Among the photochromic compounds suitable for the purposes of the present invention are the following specific compounds:

4-(p-quarterphenyl-4-ylmethyl)benzophenone

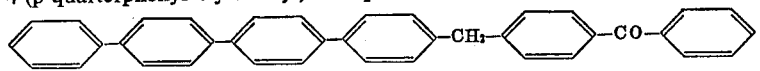

4-(p-terphenyl-4-ylaminomethyl)benzophenone

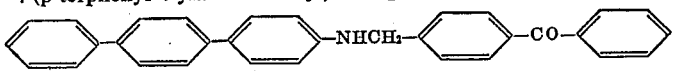

4-(3-fluoroenyloxy)benzophenone

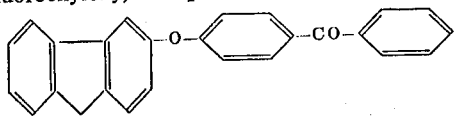

2-(p-terphenyl-4-ylmethyl)triphenylene

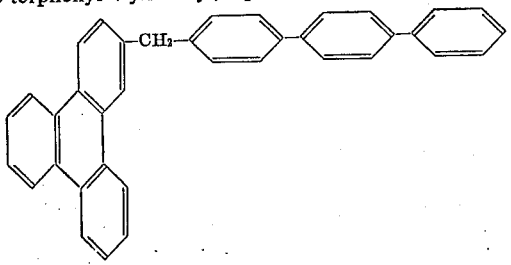

The following examples are presented to further illustrate the present invention.

EXAMPLE 1

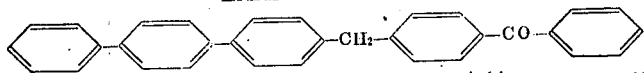

To a solution of 5.4 g. (0.0157 mole) of 4-(4-cyanobenzyl)-p-terphenyl in 25 ml. of benzene, there is added 5.4 g. of a 3 M solution of phenylmagnesium bromide in ether. After the reaction mixture has been refluxed for 16 hours and cooled, a white precipitate is separated by filtration and washed with hot benzene. The material is hydrolyzed with saturated aqueous ammonium chloride solution and sufficient benzene and ethyl acetate is added to dissolve all the solid material. Separation of the organic solvent from the aqueous fraction and evaporation of the organic solvents yields a pale yellow crystalline solid. A suspension of the solid in 120 ml. toluene, 70 ml. of dioxane and 100 ml. of 25% by volume of sulfuric acid is refluxed for several hours. To the cooled reaction mixture, sufficient methylene chloride and ethyl acetate is added to dissolve all of the solid material. After separation of the aqueous fraction, the organic solution is washed with aqueous sodium bicarbonate and water. Evaporation of the solvent leaves a crystalline solid which, after recrystallization from ethyl acetate, appears as colorless plates melting at 212° C. The product is 4-(p-terphenyl-4-ylmethyl)-benzophenone.

When the procedure is repeated substituting equivalent amounts of 4-(4-cyanobenzyl)-p-quaterphenyl, 4-(4-cyanobenzyl)-p-quinquephenyl or 4-(4 - cyanobenzyl)-p-sexiphenyl for the 4-(4-cyanobenzyl)-p-terphenyl, the products are 4-(p-quaterphenyl - 4 - ylmethyl)benzophenone, 4-(p-quinquephenyl-4-ylmethyl)benzophenone and 4-(p-sexiphenyl-4-ylmethyl)benzophenone, respectively.

When the procedure is repeated substituting an equivalent amount of 4-(4-cyano-3-methylbenzyl)-p-terphenyl for the 4-(4-cyanobenzyl)-p-terphenyl, the product is 2-methyl-4-(p-terphenyl-4-ylmethyl)benzophenone.

When the procedure is repeated substituting equivalent amounts of p-chlorophenylmagnesium bromide for the phenylmagnesium bromide, the product is 4'-chloro-4-(p-terphenyl-4-ylmethyl)benzophenone.

EXAMPLE 2

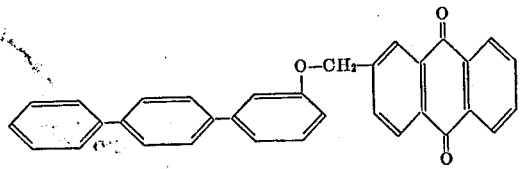

A mixture of 2.0 g. (0.00664 mole) of 2-bromomethyl)-anthraquinone, 1.6 g. (0.00671 mole) of 3-hydroxy-p-terphenyl, 0.926 g. (0.00671 mole) of potassium carbonate and 200 ml. of 75% aqueous acetone is refluxed for 24 hours. Additional water is added and acetone is evaporated. The resulting precipitate is separated by filtration, washed with water and acetone and dried. The desired product, 2 - (p-terphenyl-3-yloxymethyl)anthraquinone is obtained, after recrystallization from chlorobenzene and butyl acetate-chlorobenzene, as yellow crystals melting at 258–259° C.

When the procedure is repeated substituting equivalent amounts of 2-anthrol or 2-pyrenol for the 3-hydroxy-p-terphenyl, the products are 2-(2-anthryloxymethyl)anthraquinone and 2-(2-pyrenyloxymethyl)anthraquinone, respectively.

EXAMPLE 3

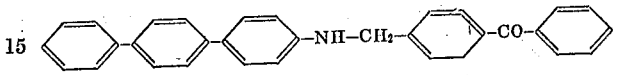

A mixture of 1.40 g. (0.005 mole) of 4-(bromomethyl)benzophenone, 1.23 g. (0.005 mole) of p-terphenyl-4-amine, 0.75 g. of potassium carbonate and 50 ml. of 80% aqueous acetone is refluxed for 28 hours. The precipitate is separated by filtration, washed with methanol and dried. The dried product, 4-(p-terphenyl-4-ylaminomethyl)benzophenone is obtained, after recrystallization from benzene, as yellow crystals melting at 235–237° C.

When the procedure is repeated substituting equivalent amounts of 2-anthramine or 2-chrysenamine for the p-terphenyl-4-amine, the products are 4-(2-anthrylaminomethyl)benzophenone and 4-(2-chrysenylaminomethyl)benzophenone, respectively.

EXAMPLE 4

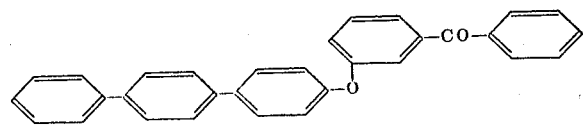

A mixture of 3.1 g. (0.010 mole) of 4-bromo-p-terphenyl, 2.2 g. (0.011 mole) of 3-hydroxybenzophenone, 0.5 g. of cuprous oxide, 45 ml. of 2,4,6-collidine and 0.75 g. of sodium iodide is refluxed for 5 days. The cooled mixture is poured into dilute hydrochloric acid, and the resulting precipitate is separated by filtration, washed with water and dried. The precipitate is extracted with benzene, and from the benzene solution, by addition of petroleum ether, there is obtained the desired product, 3-(p-terphenyl-4-yloxy)benzophenone, which, after purification by chromatography on alumina and recrystallization from isopropyl alcohol, appears as white crystals melting at 134–135° C.

When the procedure is repeated substituting 1-bromopyrene or 2-bromofluorene for the 4-bromo-p-terphenyl, the products are 3-(1-pyrenyloxy)benzophenone and 3-(2-fluorenyloxy)benzophenone, respectively.

EXAMPLE 5

A mixture of 5.94 g. (0.03 mole) of 4-hydroxybenzophenone and 1.12 g. (0.02 mole) of potassium hydroxide is heated at 280–290° C. in an atmosphere of nitrogen until the water formed is removed. To the melt there is added 0.1 g. of copper powder and 3.70 g. (0.01035 mole) of 4-iodo-p-terphenyl and the mixture is heated at 330–340° C. for 6 hours. The cooled and solidified melt is ground and triturated with hot 30% potassium hydroxide. The residue is dissolved in hot chloroform and the filtrate is evaporated. After recrystallization from chlorobenzene and from butyl acetate, the material is chromatographed on alumina using chloroform as the eluant and recrytallized again from chloroform. The colorless crystalline product 4-(p-terphenyl-4-yloxy) benzophenone, melts at 245.5–247.5° C.

EXAMPLE 6

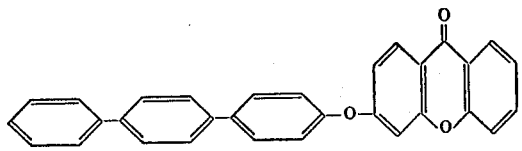

A mixture of 2.33 g. (0.011 mole) of 3-hydroxyanthone, 3.70 g. (0.0104 mole) of 4-iodo-p-terphenyl, 0.86 g. (0.006 mole) of cuprous oxide and 4 ml. of 2,4,6-collidine is refluxed in an atmosphere of nitrogen for 72 hours. The precipitate resulting from the addition of the reaction mixture to 400 ml. of dilute hydrochloric acid is separated by filtration and triturated with methylene chloride, finally with hot chloroform. The chloroform solution is washed successively with 5 N hydrochloric acid, 2.5 N sodium hydroxide and saturated aqueous chloride solutions. The residue from the evaporation of the chloroform is chromatographed on alumina using benzene and chloroform as eluents. The intermediate fractions are combined and recrystallized from butanol and then from chlorobenzene. The colorless, crystalline product, 3-(p-terphenyl-4-yloxy)xanthone, melts at 229–230° C.

EXAMPLE 7

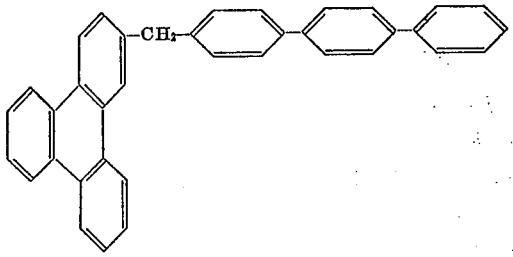

A mixture of 0.6 g. (0.00127 mole) of p-terphenyl-4-yl 2-triphenylenyl ketone, 10.0 ml. of diethylene glycol, 2 ml. of hydrazine hydrate and 1.0 g. of potassium hydroxide is heated for 1 hour on a steam bath. After removing water by distillation, the mixture is refluxed (240° C.) for 2 hours. The solid material obtained by addition of water, acidification with hydrochloric acid and filtration is recrystallized from tetrahydrofuran. The product, 2-(p-terphenyl-4-ylmethyl)-triphenylene, melts at 267.5–268° C.

EXAMPLE 8

To a solution of 0.1 g. 4-(p-terphenyl-4-ylmethyl)-benzophenone in a mixture of about 46.5 g. inhibitor-free methyl methacrylate monomer and about 2.5 g. ethylene dimethylacrylate, there is added 0.01% azobisisobutyronitrile, based on the weight of the monomer. After degassing to a pressure equivalent to less than $10^{-5}$ mm. of mercury, polymerization is allowed to take place in a cylindrical mold, first at 50° C. for 12 hours and then at 80° C. for 72 hours. The rough cylinder of poly(methyl methacrylate) is machines to a right cylinder 4 cm. long x 2 cm. dia. The ends of the cylinder are polished to provide an optical finish.

When exposed to sunlight or the radiation of an RS-type sunlamp, the polymer changes from colorless to yellow. When the polymer cylinder is illuminated coaxially with a 250-Joule flash from an unfiltered xenon discharge, the cylinder is opaque along the 4-cm. dimension to radiation from 380 nm. to 540 nm. for 100 microseconds after the peak of the flash. The mean lifetime of the coloration is about 1 second at room temperature.

When the procedure is repeated substituting 2-methyl-4-(p-terphenyl-4-ylmethyl)benzophenone or 4'-chloro-4-(p-terphenyl-4-ylmethyl)benzophenone for the 4-(p-terphenyl-4-ylmethyl)benzophenone, the polymer undergoes a similar color change on exposure to sunlight.

When the procedure is repeated substituting 4-(p-quaterphenyl-4-ylmethyl)benzophenone, 4-(p-quinquephenyl-4-ylmethyl)benzophenone or 4-(p-sexiphenyl-4-ylmethyl) benzophenone for the 4-(p-terphenyl-4-ylmethyl)benzophenone, the resulting polymer, on exposure to sunlight, becomes magenta, blue and blue, respectively.

When the 4-(p-terphenyl-4-ylmethyl)benzophenone is equilibrated with a large excess of heavy water by a procedure based on the method described in Organic Syntheses With Isotopes by Murray and Williams, 1958 (Interscience Publishers, Inc., New York), page 1446, Method II, the lifetime of the coloration is approximately doubled and the intensity of the color change is enhanced.

EXAMPLE 9

The procedure of Example 8 is repeated substituting 2-(p-terphenyl-3-yloxymethyl)anthraquinone, a product of Example 2, for the 4-(p-terphenyl-4-ylmethyl)benzophenone.

When exposed to sunlight or the radiation of an RS-type sunlamp, the polymer changes from colorless to yellow.

EXAMPLE 10

The procedure of Example 8 is repeated substituting 4-(2-chrysenylaminomethyl)benzophenone, a product of Example 3, for the 4-(p-terphenyl-4-ylmethyl)benzophenone.

When exposed to sunlight, the polymer becomes blue.

EXAMPLE 11

A mixture of 0.050 g. of 4-(p-terphenyl-4-ylaminomethyl)benzophenone, a product of Example 3, and 2.16 g. of a commercial epoxy resin (Shell Epon 828) is dissolved in about 45 g. of benzene. The benzene is then evaporated, the last traces being removed in vacuo, and the residual solution is mixed with 2.0 g. of phthalic anhydride, with slight heating to effect solution.

The resin mixture is cast between two lantern slide cover glasses with 0.5 mm. cellulose acetate spacers and cured in an oven at 120° C. for two days.

When the polymer sheet is exposed to a mercury SH arc lamp, the polymer changes from pale yellow to deep blue-violet with a lifetime of about 1 second. In sunlight, the color is light blue.

EXAMPLE 12

A $10^{-5}$ mole per liter solution of 3-(p-terphenyl-4-yloxy)benzophenone, a product of Example 4, in methylcyclohexane is freed of oxygen by repeatedly shaking in an atmosphere of argon. The solution is transferred to an optical cell (approximately 1 cm. in diameter by 14 cm. long). When the cell is illuminated coaxially by a 250 Joule flash, a very strong transient absorption appears at about 460 nm.

EXAMPLE 13

The procedure of Example 12 is repeated substituting 4-(p-terphenyl-4-yloxy)benzophenone, the product of Example 5, for the 3-(p-terphenyl-4-yloxy)benzophenone, and tetrahydrofuran for the methylcyclohexane. The absorption appears at about 425 nm.

EXAMPLE 14

The procedure of Example 12 is repeated substituting 3-(p-terphenyl-4-yloxy)xanthone, the product of Example 6, for the 3-(p-terphenyl-4-yloxy)benzophenone. The absorption appears at about 477.5 nm.

EXAMPLE 15

The procedure of Example 12 is repeated substituting 2-(p-terphenyl-4-ylmethyl)triphenylene, the product of Example 7, for the 3-(p-terphenyl-4-yloxy)benzophenone. The absorption appears at about 462.5 nm.

EXAMPLE 16

The procedure of Example 12 is repeated substituting 2-(2-anthryloxymethyl)anthraquinone, a product of Example 2, for the 3-(p-terphenyl-4-yloxy)benzophenone. The absorption appears at about 424 nm.

EXAMPLE 17

The procedure of Example 12 is repeated substituting 2-(2-pyrenyloxymethyl)anthraquinone, a product of Example 2, for the 3-(p-terphenyl-4-yloxy)benzophenone. The absorption appears at about 416 nm. and 520 nm.

EXAMPLE 18

The procedure of Example 12 is repeated substituting 4-(2-anthrylaminomethyl)benzophenone, a product of Example 3, for the 3-(p-terphenyl-4-yloxy)benzophenone. The absorption appears at 424 nm.

EXAMPLE 19

The procedure of Example 12 is repeated substituting 3-(1-pyrenyloxy)benzophenone, a product of Example 4, for the 3-(p-terphenyl-4-yloxy)benzophenone. The absorption appears at about 416 nm. and 519.5 nm.

EXAMPLE 20

The procedure of Example 12 is repeated substituting 3-(2-fluorenyloxy)benzophenone, a product of Example 4, for the 3-(p-terphenyl-4-yloxy)benzophenone. The absorption appears at about 503 nm.

The compounds of the present invention may be used in a solid matrix, protected from oxygen and reactive monomer, in a flash protector such as described in U.S. Pat. 3,152,215, Barstow et al., Oct. 6, 1964, Flashblindness Protective Apparatus. The present materials are of the greater activity speculated upon in column 3, lines 31 to 42, so that the orders of magnitude greater activity permits sunlight uses, and much smaller power supplies for the uses described in 3,152,215.

Some of the components A and D may be good photochromic compounds in their own right. For instance substituted phenanthrenes such as 2,7-diphenylphenanthrene [J. Org. Chem. 26, 2662 (1961)], 2,7-bis(4-ethylphenyl)-phenanthrene; 2,7 - bis(3 - n-hexylphenyl)phenanthrene; 2,7 - bis(m - terphenyl - 5 - yl)phenanthrene; 2,7-di-4-biphenylphenanthrene and 2,7 - diphenyl-9-methylphenanthrene; are photochromic compounds in their own right, but become much more effective when used in the single and double energy transfer relationship.

Corresponding triphenylene compounds are useful. Triphenylene can be considered as a 9,10-benz-phenanthrene. Such compounds include 2-phenyltriphenylene [J. Org. Chem. 25, 272 (1960)], 2-(4-methoxyphenyl)triphenylene; 2 - (4 - biphenylyl)triphenylene and 3-methoxy-2-(4-biphenylyl)-triphenylene.

Some of the components can be fairly complex in their own right as for example 2-(4-biphenylyl)cinchoninic acid or esters thereof as for instance as represented by the formula:

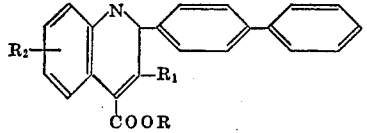

R and $R_2$ are hydrogen or lower alkyl and $R_1$ is hydrogen, hydroxyl, lower alkoxy or lower acyloxy. (Cinchoninic acid is 4-quinolinecarboxylic acid.).

EXAMPLE 21

Polycarbonate matrix

A solution of 4-(p-terphenyl-4-ylmethyl)benzophenone, from Example 1 in benzene is freeze dried so as to yield a mixture of amorphous and microcrystalline product. This is mixed intimately with finely-powdered Lexan polycarbonate in an atmosphere of dry nitrogen. The resulting mixture, $5 \times 10^{-3}$ molar, is compression-molded in a dry nitrogen atmosphere to form a clear disk having a diameter of 2" and a thickness of 2 mm., which is sealed between two Pyrex glass disks having a 2" diameter and thickness, each, of 1.5 mm. to protect the plastic from atmospheric oxygen and water vapor. The disk becomes yellow when exposed to near ultraviolet radiation.

EXAMPLE 22

Epoxy matrix

A quantity, 0.22 mg., of the same material is added to 9.055 g. of the diglycidyl ether of bisphenol-A (Dow Epoxy Resin 332 R) and heated to 65° C. until the former dissolves in the molten resin. To this is added 0.135 g. of trimethylolpropane which is dissolved by heating to 75° C. after which the solution is cooled to 65° C. and 0.811 g. of diethylenetriamine added with stirring. The clear solution is then poured into a hard glass test tube of 9 mm. bore whose interior previously has been treated with a release agent (ReleasaGen R) and buffed to remove all excess. The tube is kept at 65° C. for about 50 minutes after which the temperature is lowered to 40° C. After one additional hour the source of heat is removed and the sample permitted to sit at room temperature (25° C.) overnight. The sample is then heated at 75° C. for about 8 hours and finally at 100° C. for 30 minutes after which it is permitted to cool, then removed from the tube. Because of the temperature of the reaction, air is essentially insoluble. From the cylindrical sample thus formed ($6 \times 10^{-5}$ molar) a section 1.5 cm. long by 0.9 cm. in diameter is provided with plane-parallel, polished windows at either end, and the $T^1$—$T$ absorption spectrum photographed using steady-state excitation. When the epoxy sample is compared with its poly(methyl methacrylate) analogue (same concentration, same size and same level of excitation), the epoxy sample gives a stronger photochromic effect which is more pronounced at a lower level of excitation.

EXAMPLE 23

Vacuum melting

A sample consisting of 1.5 g. powdered polycarbonate resin (Lexan® Grade 105, Color 111 Natural) is mixed with 1 mg. of finely divided powdered 3-(p-terphenyl-4-yloxy)benzophenone from Example 4 in a plastic vial by shaking for 15 minutes using a "Wiggle Bug"®. The dry mixture is placed in a flatbottom stainless steel pan having a diameter of 3 cm. at the bottom and flared walls, which is placed on the surface of a flat, 400 watt heating disk. The sample is heated in vacuum (pressure less than $1 \times 10^{-6}$ torr) for approximately 30 minutes. The rate of heating is adjusted as needed to control degassing and bubbling so as to produce an optically transparent, bubble-free sample in the bottom of the pan which is then permitted to cool in vacuum.

While in vacuum, the sample shows phosphorescence. When excited by U.V. radiation, strong absorption at about 460 nm. appears.

The above examples are illustrative only. The prior art, including pending applications, cited above, show a wide variety of methods of using photochromic materials, and forming filters. To avoid unduly lengthening this disclosure, this matter is hereby incorporated by reference rather than set forth in redundant detail.

The scope of the invention is set forth in the claims.

I claim:

1. A photochromic composition of matter capable of exhibiting photochromism upon exposure to light having wavelengths in the range of 200–2,000 nanometers, comprising:
    (a) a poly(methylmethacrylate) substrate capable of transmitting light in the range of 200–2,000 nanometers, free from molecular oxygen, and unreacted monomer (b) about 0.0001 to 2.0% based on the weight of (a), of a photochromic compound of the formula:

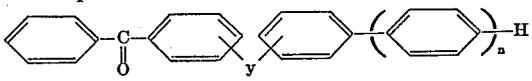

wherein $y$ is a bridging function selected from the group consisting of —$CH_2$—; —$CH_2NH$—; and —O— with the bond to each of the benzophenone moiety and the straight line polyphenylene moiety in the 3 or 4 position, and $n$ is 1, 2, 3, 4 or 5, the benzophenone moiety having a high intersystem crossing efficiency between the first excited singlet state and the lowest triplet state and the polyphenylene moiety thereof having a first excited singlet state lying at a higher energy than the first excited singlet state of the benzophenone and a lowest triplet state at a lower energy level than the lowest triplet state of the benzophenone and an energy difference between the first triplet level and the higher triplet level which is different from the energy difference between the ground state and the first excited singlet state of benzophenone.

2. The composition of claim 1 wherein the photochromic compound is 4-(p-quaterphenyl-4-ylmethyl) benzophenone.

3. The composition of claim 1 wherein the photochromic compound is 4-(p-quinquephenyl-4-ylmethyl) benzophenone.

4. A composition of matter which exhibits photochromism upon exposure to light having a wavelength in the range of 200–2,000 nanometers, comprising:

(a) a polymeric substrate capable of transmitting light in the range of 200–2,000 nm., and free from molecular oxygen and unreacted monomer selected from the group consisting of solid polymeric epoxy resin and polycarbonate resin having dissolved therein (b) about 0.0001 to 2.0% based on the weight of (a), of 4-(p-terphenyl-4-yl) benzophenone.

References Cited

UNITED STATES PATENTS

| | | | |
|---|---|---|---|
| 2,756,149 | 7/1956 | Saunders et al. | 252—300 |
| 2,888,346 | 5/1959 | Tulegih et al. | 252—300 |
| 3,014,957 | 12/1961 | Hoehn | 252—300 |
| 3,160,665 | 12/1964 | Siegrist et al. | 252—300 |
| 3,413,234 | 11/1968 | Taylor et al. | 252—300 |
| 3,214,383 | 10/1965 | Moore et al. | 252—300 |
| 3,214,382 | 10/1965 | Windsor | 252—300 |
| 3,270,629 | 9/1966 | Windsor | 252—300 |
| 3,304,180 | 2/1967 | Dorion | 96—90 PC |
| 2,976,459 | 3/1961 | Hardy et al. | 252—300 |
| 3,386,829 | 6/1968 | Newland | 96—90 PC |
| 3,486,899 | 12/1969 | Brown | 252—300 |
| 3,461,287 | 8/1969 | Rai | 252—300 |

FOREIGN PATENTS

| | | | |
|---|---|---|---|
| 746,257 | 11/1966 | Canada | 252—300 |

GEORGE F. LESMES, Primary Examiner

J. P. BRAMMER, Assistant Examiner

U.S. Cl. X.R.

350—160

UNITED STATES PATENT OFFICE
CERTIFICATE OF CORRECTION

Patent No. 3,725,292      Dated April 3, 1973

Inventor(s) Gerard Ernest Gerhardt

It is certified that error appears in the above-identified patent and that said Letters Patent are hereby corrected as shown below:

Col. 2, line 1, "Epoxides" should read -- Epoxies -- .

Col. 2, line 13, "3,636,481" should read -- 3,639,481 -- .

Col. 7, line 4, "single" should read -- singlet -- .

Col. 8, line 21, "he" should read -- the -- .

Col. 8, line 21, "fragmens" should read -- fragments -- .

Col. 9, line 41, "diphenyl" should read -- biphenyl -- .

Col. 9, line 47, "phenylglyozal" should read -- phenylglyoxal --

Col. 10, line 11, "1", second occurrence, should read -- 7 -- .

Col. 11, line 70, "$\overset{|}{\text{C}}$", should read -- $\overset{|}{\underset{|}{\text{C}}}=0$ -- .

Col. 14, line 66, "quarterphenyl" should read -- quaterphenyl --

Col. 16, line 26, "dried", second occurrence, should read -- desired -- .

Signed and sealed this 7th day of August 1973.

(SEAL)
Attest:

EDWARD M. FLETCHER, JR.
Attesting Officer

RENE D. TEGTMEYER
Acting Commissioner of Patents